(12) United States Patent
Kao

(10) Patent No.: US 11,072,287 B1
(45) Date of Patent: Jul. 27, 2021

(54) VEHICLE REAR MIRROR DEVICE

(71) Applicant: TKS INDUSTRIAL CO., LTD., Tainan (TW)

(72) Inventor: Chung-Hsu Kao, Tainan (TW)

(73) Assignee: TKS INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 16/835,792

(22) Filed: Mar. 31, 2020

(51) Int. Cl.
*B60R 1/12* (2006.01)
*B60Q 1/26* (2006.01)
*B60R 1/06* (2006.01)

(52) U.S. Cl.
CPC .......... *B60R 1/1207* (2013.01); *B60Q 1/2665* (2013.01); *B60R 1/06* (2013.01); *B60R 2001/1215* (2013.01)

(58) Field of Classification Search
CPC . B60R 1/1207; B60R 1/06; B60R 2001/1215; B60Q 1/2665
See application file for complete search history.

(56) References Cited

U.S. PATENT DOCUMENTS

| | | | | |
|---|---|---|---|---|
| D394,833 S | * | 6/1998 | Muth | D12/187 |
| 5,788,357 A | * | 8/1998 | Muth | B60Q 1/2665 362/494 |
| 5,938,320 A | * | 8/1999 | Crandall | B60R 1/1207 362/494 |
| 6,264,353 B1 | * | 7/2001 | Caraher | B60Q 1/2665 340/475 |
| 9,102,281 B2 | * | 8/2015 | Rodriguez Barros | B60Q 1/2665 |
| 9,463,733 B1 | * | 10/2016 | Kao | B60Q 1/0035 |
| 9,847,028 B1 | * | 12/2017 | Kendall | B60R 1/006 |
| 10,124,734 B1 | | 11/2018 | Kao | |
| 10,589,686 B2 | * | 3/2020 | Lynam | B60R 1/1207 |
| 10,943,488 B2 | * | 3/2021 | Kendall | B60R 1/1207 |
| 2014/0146556 A1 | * | 5/2014 | Kao | F21S 43/20 362/518 |
| 2020/0377009 A1 | * | 12/2020 | Schmidt | F21V 5/008 |

* cited by examiner

*Primary Examiner* — Nimeshkumar D Patel
*Assistant Examiner* — Tania Courson
(74) *Attorney, Agent, or Firm* — Birch, Stewart, Kolasch & Birch, LLP

(57) ABSTRACT

A vehicle rear mirror device includes a mounting plate, a mirror, a frame, a plurality of light emitting members, and a light guiding member. In response to a switch-on of a direction-indicator lamp, the light emitting members emit light to illuminate a direction-indicating pattern on the mirror to thereby warn a driver of a sidewise-approaching vehicle.

3 Claims, 6 Drawing Sheets

VEHICLE REAR MIRROR DEVICE

FIELD

The disclosure relates to a vehicle rear mirror device, more particularly to a vehicle rear mirror device for warning a driver of a sidewise-approaching vehicle in response to a switch-on of a direction-indicator lamp.

BACKGROUND

As shown in FIG. 1, two conventional rear mirrors (only one is shown) are mounted at two sides of a vehicle 10, and each of the rear mirrors 11 includes a mirror casing 111 and a mirror 112 mounted to the mirror casing 111. The driver of the vehicle 10 can see the rear side traffic situation which is reflected in the mirrors 112 of the rear mirrors 11 whilst driving. In consideration of the driving safety, the driver may activate a direction-indicator lamp 12 at a corner of the vehicle 10 when intending to turn or change lane. However, a driver of a sidewise-approaching vehicle (not shown) may not be able to notice the flashing of the direction-indicator lamp 12.

SUMMARY

Therefore, an object of the disclosure is to provide a vehicle rear mirror device for warning a driver of a sidewise approaching vehicle in response to a switch-on of a direction-indicator lamp.

According to the disclosure, a vehicle rear mirror device is provided for warning a driver of a sidewise-approaching vehicle in response to a switch-on of a direction-indicator lamp, and includes a mirror casing, a mounting plate, a mirror, a frame, a plurality of light emitting members, and a light guiding member. The mirror casing defines therein a cavity, and has a rearward wall with an access opening in spatial communication with the cavity. The mounting plate is configured to be fitted into the cavity through the access opening, and has a mounting hole portion. The mirror is configured to be fitted in the access opening and is disposed at a rear side of the mounting plate. The mirror has a predetermined region which is determined by projection of the mounting hole portion onto the mirror in a front-rear direction, and which includes a plurality of light-transmissive zones. The light-transmissive zones are spaced apart from each other and cooperatively define a direction-indicating pattern. The frame is fitted in the mounting hole portion. The light emitting members are mounted on a rear surface of the frame in positions corresponding to the light-transmissive zones. Each of the light emitting members defines an emitter axis in the front-rear direction. The light guiding member is fitted in the mounting hole portion and is disposed between the frame and the predetermined region. The light guiding member includes a main body portion which has a rearward surface and a forward surface, and a plurality of light guiding portions which are formed on the forward surface in positions corresponding to the light emitting members so as to guide light beams from each of the light emitting members to a respective one of the light-transmissive zones, thereby illuminating the direction-indicating pattern.

With the provision of the vehicle rear mirror device in a vehicle, when a driver intends to turn or change lane and switches on the direction-indicator lamp, a driver of a sidewise-approaching vehicle may notice such information from the illuminated direction-indicating pattern on the mirror.

BRIEF DESCRIPTION OF THE DRAWINGS

Other features and advantages of the disclosure will become apparent in the following detailed description of the embodiment(s) with reference to the accompanying drawings, in which:

FIG. 6 is a fragmentary schematic view of a vehicle with the vehicle rear mirror device, illustrating that an illuminated direction-indicating pattern is generated when a direction-indicator lamp switches on.

DETAILED DESCRIPTION

Figure 1:
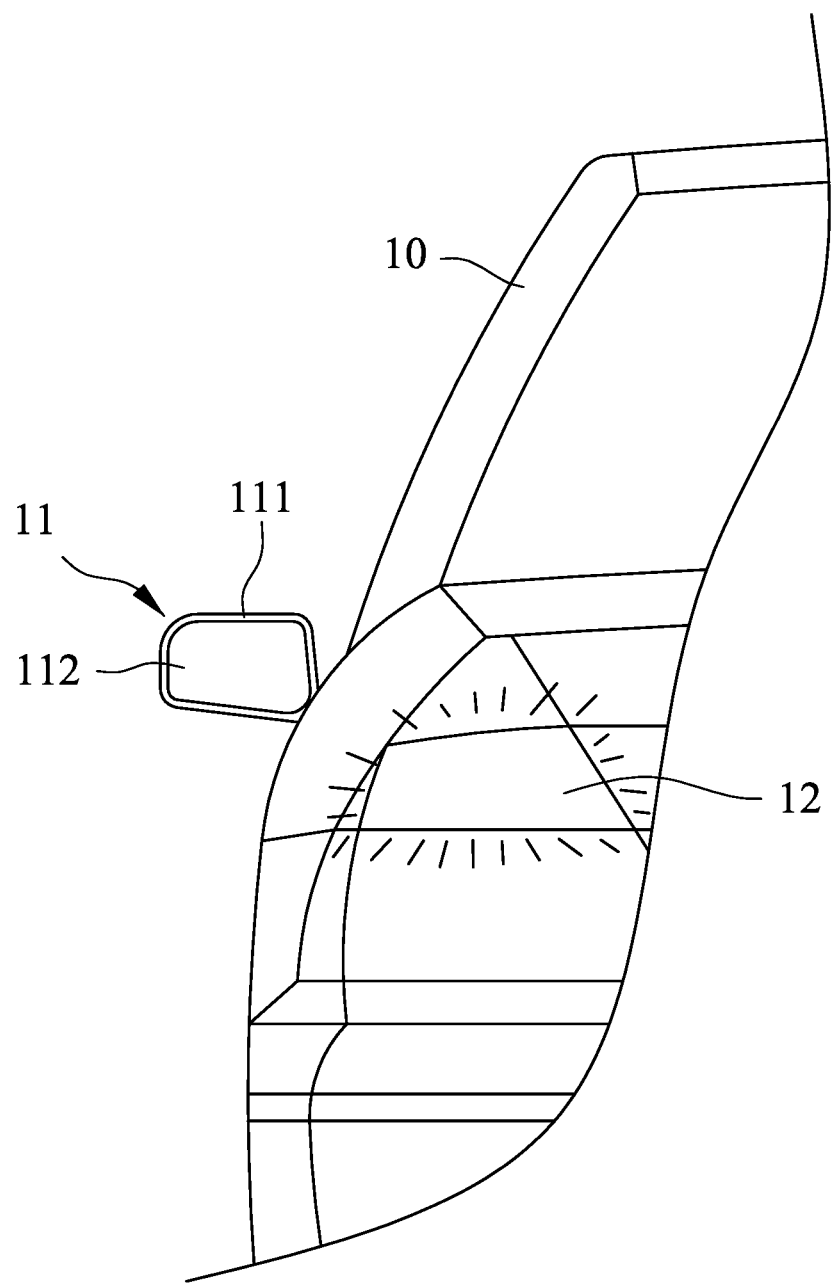
FIG. 1 is a fragmentary schematic view illustrating a conventional rear mirror of a vehicle.

Before the disclosure is described in greater detail, it should be noted that where considered appropriate, reference numerals have been repeated among the figures to indicate corresponding or analogous elements, which may optionally have similar characteristics.

Figure 2:
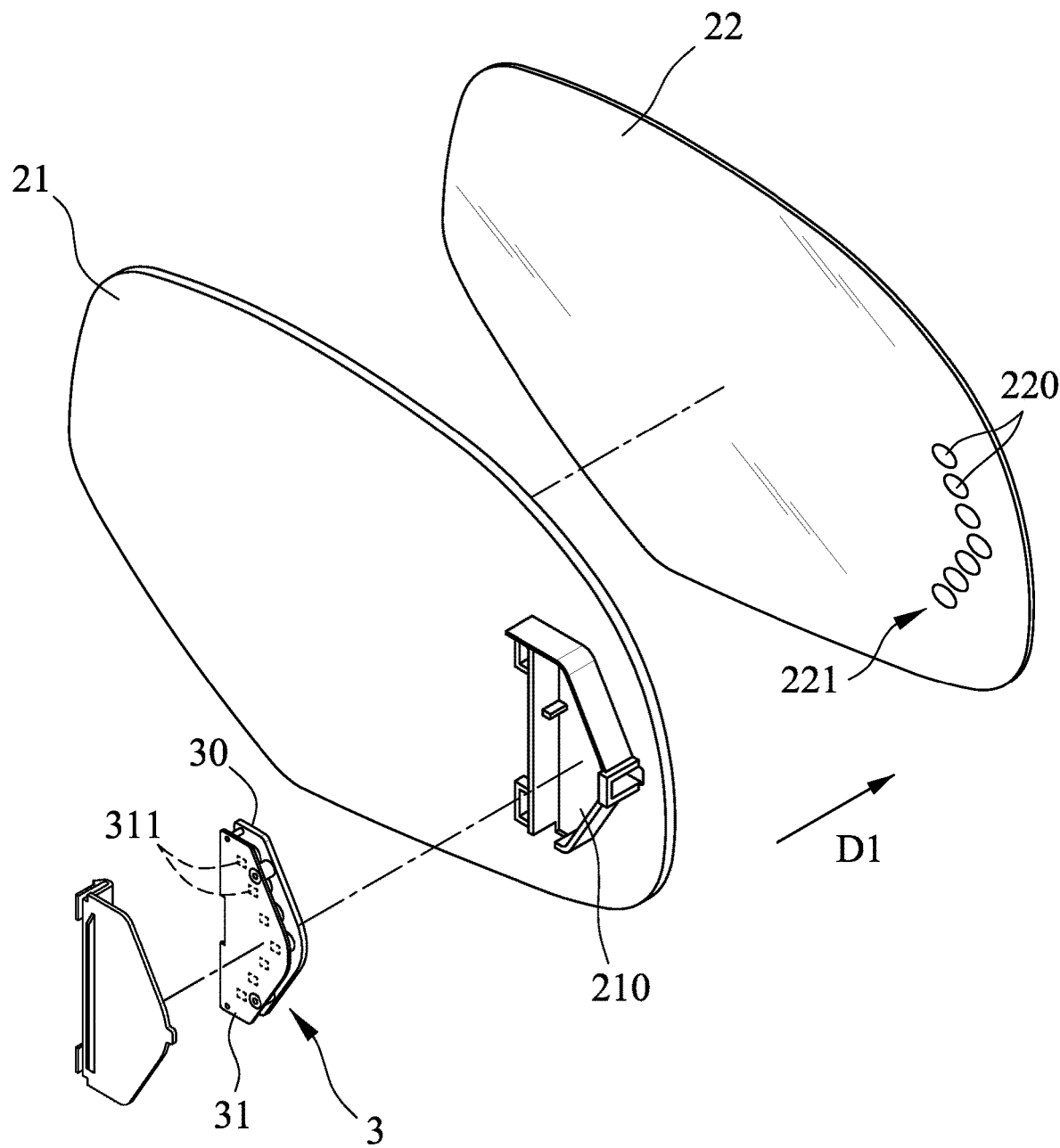
FIG. 2 is an exploded perspective view illustrating some elements in a vehicle rear mirror device according to an embodiment of the disclosure.
Figure 6:
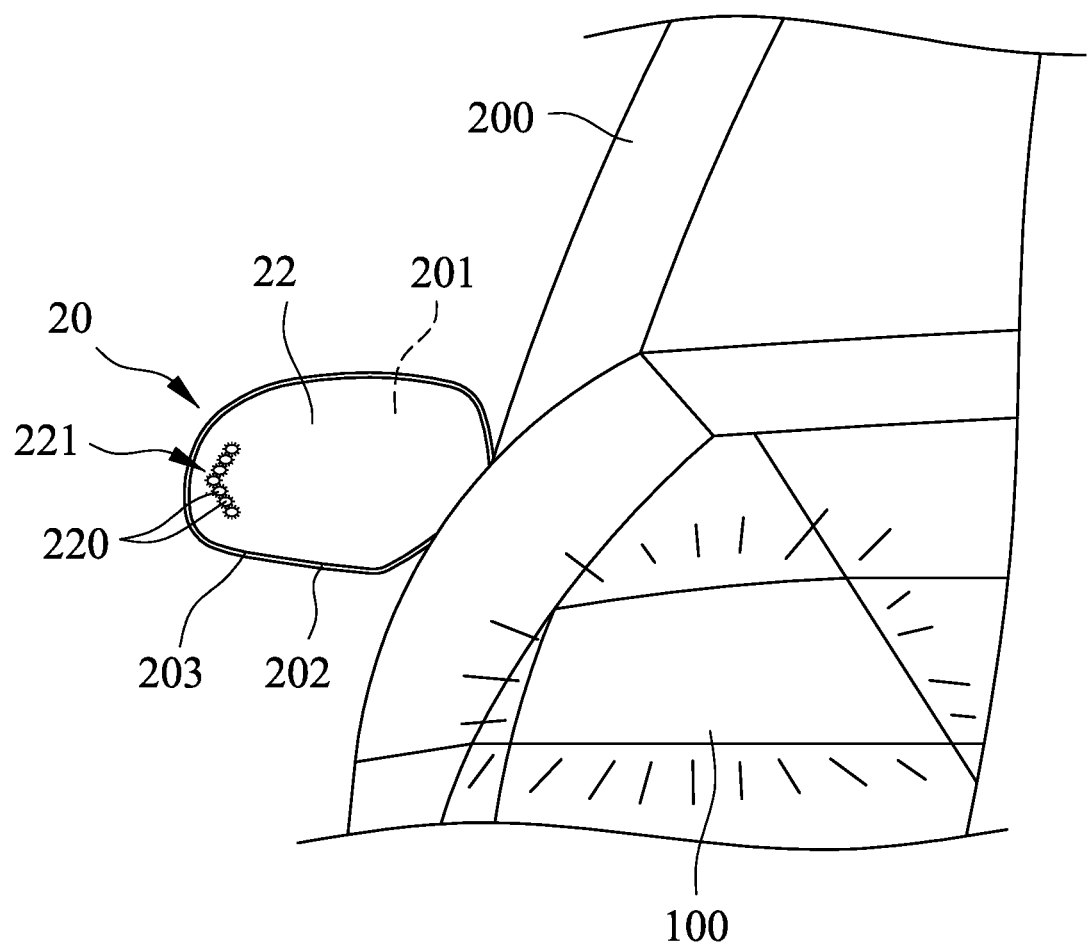

As shown in FIGS. 2 and 6, a vehicle rear mirror device according to an embodiment of the disclosure is provided on a vehicle 200 for warning a driver of a sidewise-approaching vehicle (not shown) in response to a switch-on of a direction-indicator lamp 100 of the vehicle 200, and includes a mirror casing 20, a mounting plate 21, a mirror 22, and a light emitting unit 3.

The mirror casing 20 defines therein a cavity 201, and has a rearward wall 202 with an access opening 203 in spatial communication with the cavity 201.

The mounting plate 21 (only shown in FIG. 2) is configured to be fitted into the cavity 201 through the access opening 203, and has a mounting hole portion 210.

The mirror 22 is configured to be fitted in the access opening 203 and is disposed at a rear side of the mounting plate 21. The mirror 22 has a predetermined region 221 which is determined by projection of the mounting hole portion 210 onto the mirror 22 in a front-rear direction (D1), and which includes a plurality of light-transmissive zones 220. The light-transmissive zones 220 are spaced apart from each other and cooperatively define a direction-indicating pattern.

Figure 3:
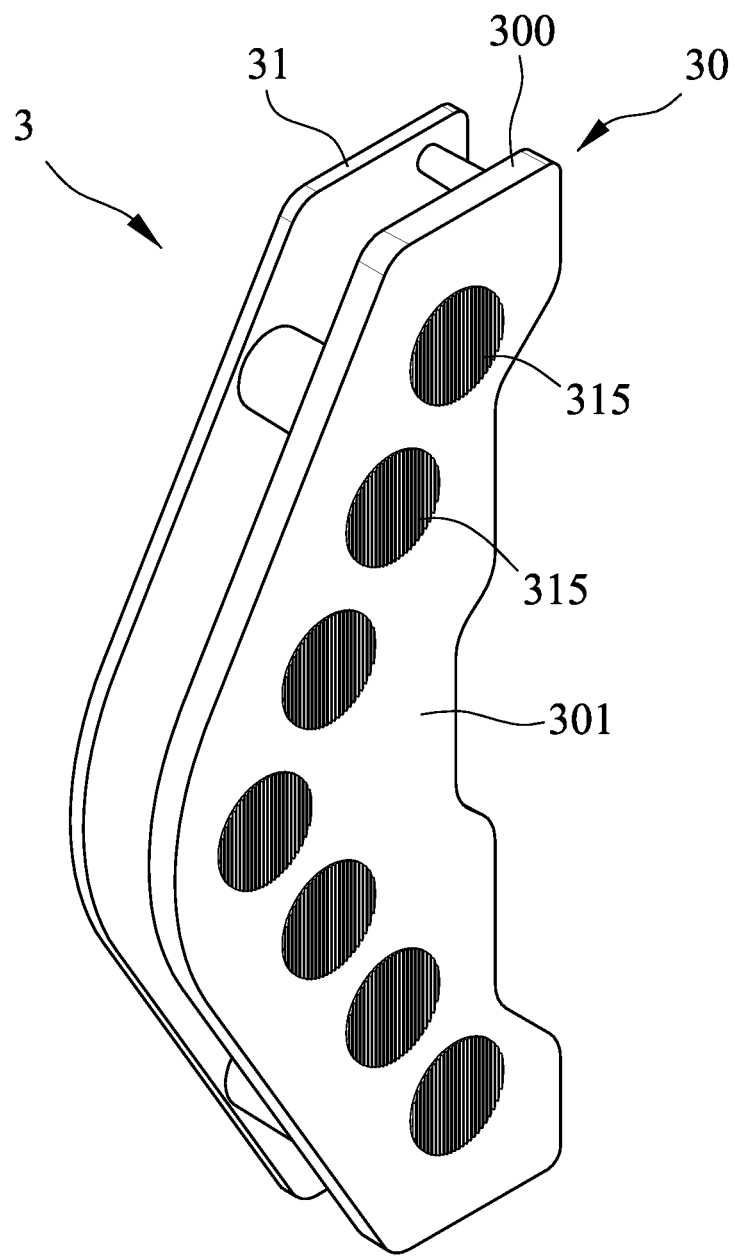
FIG. 3 is a perspective view illustrating a light emitting unit of the vehicle rear mirror device.
Figure 4:
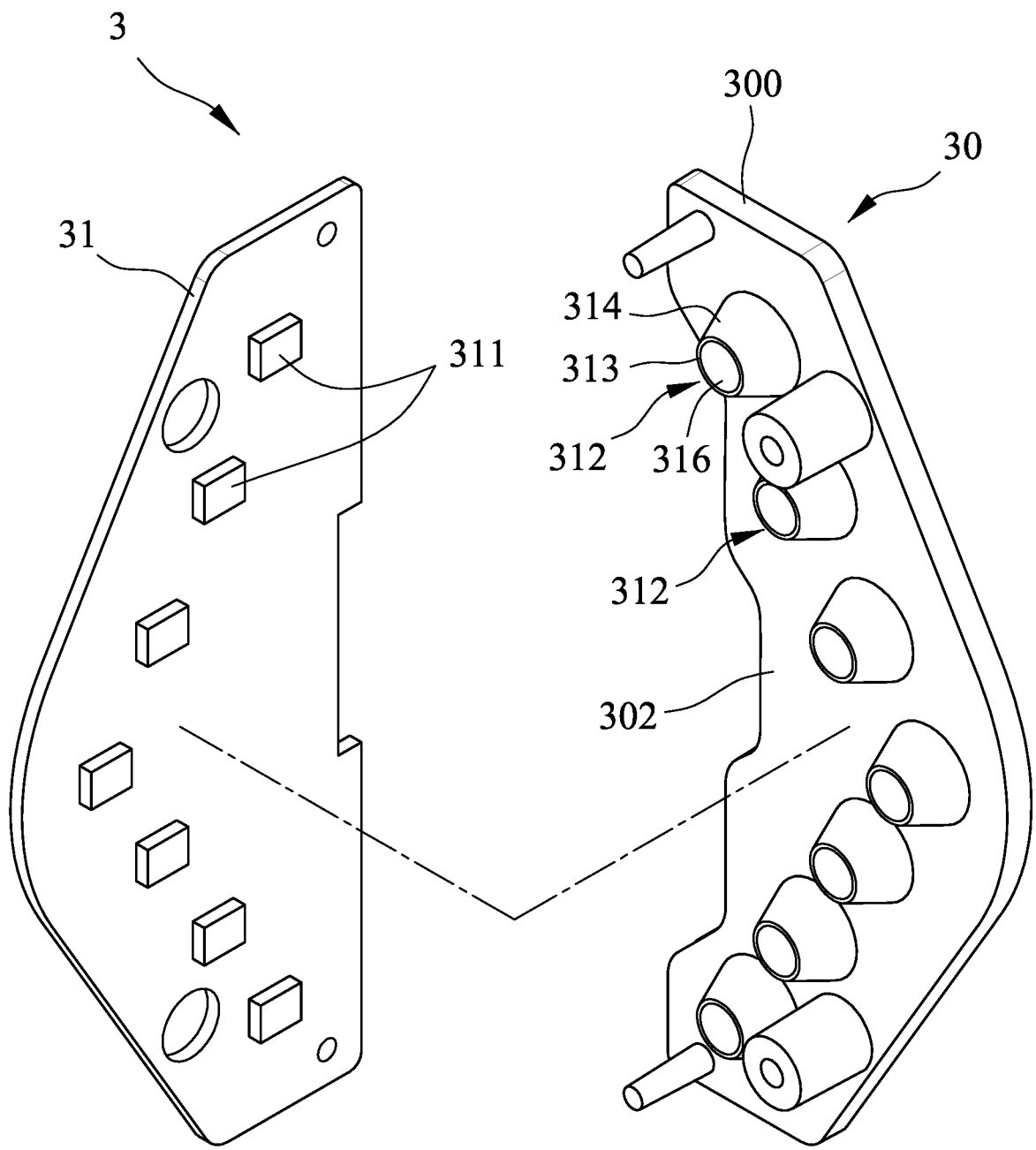
FIG. 4 is an exploded perspective view of the light emitting unit.

As shown in FIGS. 2 to 4, the light emitting unit 3 includes a frame 31, a plurality of light emitting members 311, and a light guiding member 30.

The frame 31 is fitted in the mounting hole portion 210.

The light emitting members 311 are mounted on a rear surface of the frame 31 in positions corresponding to the light-transmissive zones 220. Each of the light emitting members 311 defines an emitter axis (A) in the front-rear direction (D1) and emits light radially (see FIG. 5). In a non-limiting example, each of the light emitting members 311 may be a light emitting diode.

The light guiding member 30 is fitted in the mounting hole portion 210 and is disposed between the frame 31 and the predetermined region 221. The light guiding member 30 has a main body portion 300 and a plurality of light guiding portions 312. The main body portion 300 has a rearward surface 301 and a forward surface 302. The light guiding portions 312 are formed on the forward surface 302 in positions corresponding to the light emitting members 311 so as to guide light beams from each of the light emitting members 311 to a respective one of the light-transmissive zones 220, thereby illuminating the direction-indicating pattern.

When a driver of the vehicle 200 intends to turn or change lane to switch on the direction-indicator lamp 100, a driver of a sidewise-approaching vehicle (not shown) may notice such information from the illuminated direction-indicating pattern on the mirror 22.

Figure 5:
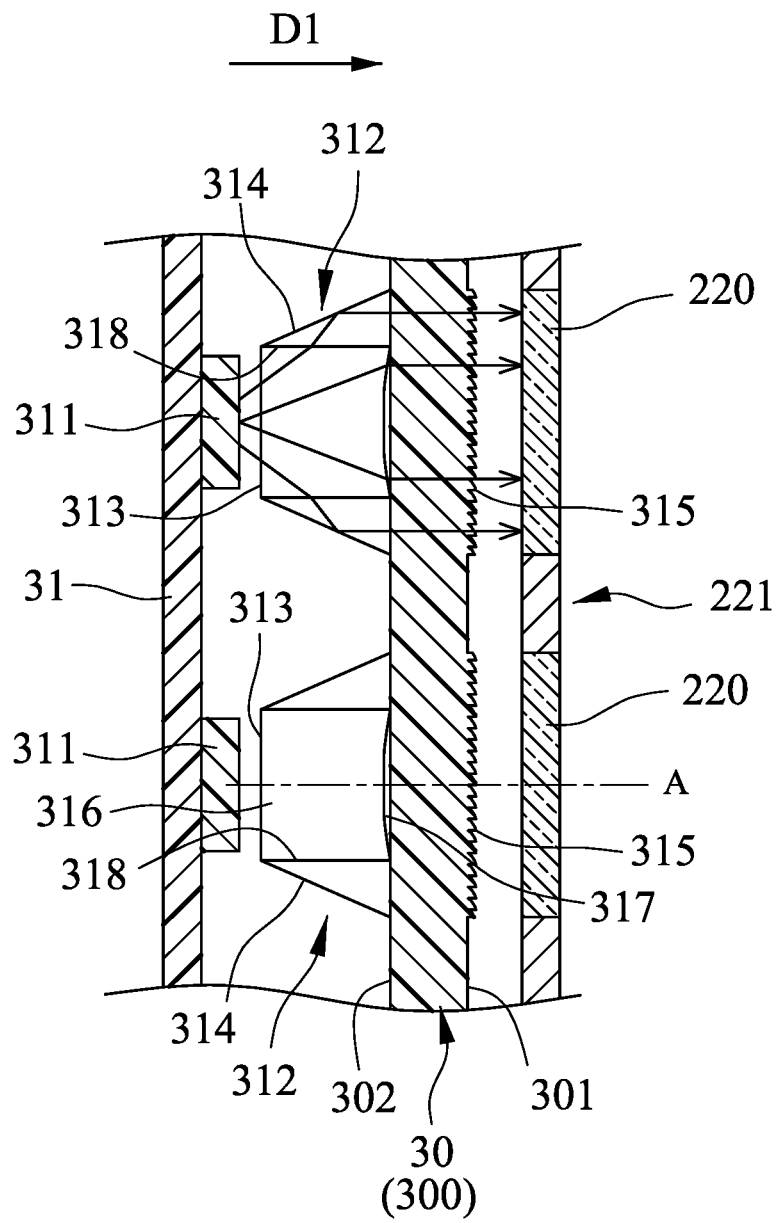
FIG. 5 is a fragmentary cross-sectional view of the vehicle rear mirror device.

In an embodiment shown in FIGS. 4 and 5, each of the light guiding portions 312 has an end region 313, an inner refractive region 318, a convex lens 317, and an outer reflective region 314. The inner refractive region 318 extends from the end region 313 along and about the emitter axis (A) of a respective one of the light emitting members 311 to terminate at the forward surface 302. The inner refractive region 318 defines a guiding hole 316 for receiving the light beams from the respective light emitting member 311. The convex lens 317 is provided in the guiding hole 316 such that when the light beams entering the guiding hole 316 reach the convex lens 317, the light beams are converged by the convex lens 317 to advance toward the respective light-transmissive zone 220. The outer reflective region 314 is disposed to surround the inner refractive region 318 such that when the light beams entering the guiding hole 316 and refracted by the inner refractive region 318 reach the outer reflective region 314, the light beams are reflected by the outer reflective region 314 to advance toward the respective light-transmissive zone 220.

In other words, each of the light guiding portions 312 is provided to permit radially-distributed light beams from the respective light emitting member 311 to advance toward the respective light-transmissive zone 220 (i.e., to advance toward or in the front-rear direction (D1)). Therefore, the light beams outputted from the light guiding member 30 are allowed to illuminate the direction-indicating pattern.

In an embodiment shown in FIGS. 4 and 5, the outer reflective region 314 diverges rearwardly from a periphery of the end region 313 in the front-rear direction (D1) to the forward surface 302.

In an embodiment, the light guiding member 30 may be integrally formed using a modular approach.

In an embodiment shown in FIGS. 3 and 4, the light guiding member 30 has a plurality of microstructure portions 315 provided on the rearward surface 301 of the main body portion 300 in positions corresponding to the light-transmissive zones 221 so as to direct the light beams from each of the light guiding portions 312 to be advanced to the respective light-transmissive zone 221.

It should be noted that once the frame 31 and the light guiding member 30 are forced to fit into the mounting hole portion 210 of the mounting plate 21, the light emitting members 311 are permitted to be in alignment with the light guiding portions 312, respectively. Therefore, the assembly of the vehicle rear mirror device may be easily achieved.

Furthermore, with the provision of the light guiding portions 312 on the main body portion 300, the light beams from the light emitting members 311 may be transmitted to the light-transmissive zones 220, respectively, and the light beams from two adjacent one of the light emitting members 311 are prevented from overlapping with each other.

Moreover, with the provision of the microstructure portions 315 on the rearward surface 301 of the main body portion 300, the direction-indicating pattern may be illuminated in an enhanced brightness.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicle rear mirror device for warning a driver of a sidewise-approaching vehicle in response to a switch-on of a direction-indicator lamp, said vehicle rear mirror device comprising:

a mirror casing defining therein a cavity, and having a rearward wall with an access opening in spatial communication with said cavity;

a mounting plate configured to be fitted into said cavity through said access opening, and having a mounting hole portion;

a mirror configured to be fitted in said access opening and disposed at a rear side of said mounting plate, said mirror having a predetermined region which is determined by projection of said mounting hole portion onto said mirror in a front-rear direction, and which includes a plurality of light-transmissive zones, said light-transmissive zones being spaced apart from each other and cooperatively defining a direction-indicating pattern;

a frame fitted in said mounting hole portion;

a plurality of light emitting members mounted on a rear surface of said frame in positions corresponding to said light-transmissive zones, each of said light emitting members defining an emitter axis in the front-rear direction; and a light guiding member fitted in said mounting hole portion and disposed between said frame and said predetermined region, said light guiding member including a main body portion having a rearward surface and a forward surface, and a plurality of light guiding portions which are formed on said forward surface in positions corresponding to said light emitting members so as to guide light beams from each of said light emitting members to a respective one of said light-transmissive zones, thereby illuminating said direction-indicating pattern, wherein each of said light guiding portions has
an end region,
an inner refractive region extending from said end region along and about the emitter axis of a respective one of said light emitting members to terminate at said forward surface, said inner refractive region defining a guiding hole for receiving the light beams from said respective light emitting member,
a convex lens provided in said guiding hole such that when the light beams entering said guiding hole reach said convex lens, the light beams are converged by said convex lens to advance toward said respective light-transmissive zone, and
an outer reflective region disposed to surround said inner refractive region such that when the light beams entering said guiding hole and refracted by said inner refractive region reach said outer reflective region, the light beams are reflected by said outer reflective region to advance toward said respective light-transmissive zone; and wherein said light guiding member has a plurality of microstructure portions provided on said rearward surface in positions corresponding to said light-transmissive zones so as to direct the light beams from each of said light guiding portions to be advanced to said respective light-transmissive zone.

2. The vehicle rear mirror device according to claim 1, wherein said outer reflective region diverges rearwardly from a periphery of said end region to said forward surface.

3. The vehicle rear mirror device according to claim 1, wherein said light guiding member is integrally formed.

* * * * *